United States Patent
Honmatsu et al.

(10) Patent No.: US 12,024,018 B2
(45) Date of Patent: Jul. 2, 2024

(54) DECORATIVE PANEL

(71) Applicant: SEKISUI POLYMATECH CO., LTD., Saitama (JP)

(72) Inventors: Yoshifumi Honmatsu, Saitama (JP); Yasushi Sakai, Saitama (JP)

(73) Assignee: SEKISUI POLYMATECH CO., LTD., Saitama (JP)

( * ) Notice: Subject to any disclaimer, the term of this patent is extended or adjusted under 35 U.S.C. 154(b) by 0 days.

(21) Appl. No.: 17/928,528

(22) PCT Filed: Jun. 11, 2021

(86) PCT No.: PCT/JP2021/022311
§ 371 (c)(1),
(2) Date: Nov. 29, 2022

(87) PCT Pub. No.: WO2022/018998
PCT Pub. Date: Jan. 27, 2022

(65) Prior Publication Data
US 2023/0211666 A1 Jul. 6, 2023

(30) Foreign Application Priority Data
Jul. 22, 2020 (JP) ................................. 2020-125813

(51) Int. Cl.
*B60K 35/10* (2024.01)
*G06F 3/044* (2006.01)

(52) U.S. Cl.
CPC .............. *B60K 35/10* (2024.01); *G06F 3/044* (2013.01)

(58) Field of Classification Search
CPC .............. B60K 37/06; B60K 2360/128; B60K 2360/1434; B60K 2360/682;
(Continued)

(56) References Cited

U.S. PATENT DOCUMENTS

| 2007/0144795 A1* | 6/2007 | Tran ...................... G06F 3/0446 |
| | | 178/18.06 |
| 2012/0306757 A1* | 12/2012 | Keist ...................... B60K 35/00 |
| | | 264/251 |

(Continued)

FOREIGN PATENT DOCUMENTS

| JP | 2011-150964 A | 8/2011 |
| JP | 2011-165384 A | 8/2011 |

(Continued)

OTHER PUBLICATIONS

International Search Report for PCT Patent App. No. PCT/JP2021/022311 (Aug. 31, 2021).

*Primary Examiner* — Hong Zhou
(74) *Attorney, Agent, or Firm* — Future IP LLC; Tomoko Nakajima

(57) ABSTRACT

A decorative panel in which a touch sensor member can be disposed with a large degree of freedom even in a relatively large electronic device is provided. The decorative panel includes a cover panel member that has an opening portion; a touch sensor member that is disposed at the opening portion; and a design film that covers the cover panel member and the touch sensor member, and that has a movable portion that supports the touch sensor member so that the touch sensor member is displaceable with respect to the cover panel member.

18 Claims, 12 Drawing Sheets

(58) Field of Classification Search
CPC .......... B60K 2360/693; B60K 2360/92; B60K 35/10; B60K 35/25; G06F 3/044; H01H 36/00

See application file for complete search history.

(56) References Cited

U.S. PATENT DOCUMENTS

| | | | |
|---|---|---|---|
| 2013/0155008 A1* | 6/2013 | Autran | G06F 3/041 345/174 |
| 2014/0036428 A1 | 2/2014 | Leong et al. | |
| 2015/0279523 A1* | 10/2015 | Oeuvrard | H01C 10/12 338/47 |
| 2018/0212603 A1 | 7/2018 | Kwak | |
| 2019/0041022 A1 | 2/2019 | Ao | |
| 2019/0042022 A1 | 2/2019 | Ao | |
| 2020/0166099 A1* | 5/2020 | Ikehara | G06F 3/0443 |
| 2021/0034207 A1* | 2/2021 | Kuraishi | G06F 3/0338 |
| 2021/0206267 A1* | 7/2021 | Carvalho Da Silva | G06F 3/0446 178/18.06 |

FOREIGN PATENT DOCUMENTS

| | | |
|---|---|---|
| JP | 2014-510319 A | 4/2014 |
| JP | 2018-529178 A | 10/2018 |
| JP | 2019-029271 A | 2/2019 |
| JP | 2019-040802 A | 3/2019 |

\* cited by examiner ated Jun. 11, 2021, which claims priority under 35 U.S.C. § 119 to Japanese Patent Application No. 2020-125813, filed Jul. 22, 2020, which are incorporated by reference.

TECHNICAL FIELD

The present disclosure of the present application relates to a decorative panel.

BACKGROUND ART

A touch sensor is widely used as an input device of an electronic device. A known example of a touch sensor is a touch sensor having a structure in which a sensor sheet, whose function is concentrated in a film substrate, and an exterior member are integrated with each other. For example, Patent Literature 1 describes an electronic device in which a plastic layer, formed by injection molding of a plastic resin, is formed on a sensor sheet including a plurality of film layers.

CITATION LIST

Patent Literature

PTL 1: Japanese Unexamined Patent Application Publication (Translation of PCT Application) No. 2014-510319, FIG. 3A, FIG. 30

SUMMARY OF INVENTION

Technical Problem

For example, a so-called instrument panel (fascia, dashboard) where instruments that display information required for driving are disposed is provided on a front side of a driver's seat of a car. Although an instrument panel used to be one where only instruments were disposed, an instrument panel is becoming, in recent years, a large component that integrally stores a car navigation system and an air bag.

For example, in a small electronic device such as that described in PTL 1, the disposition of a portion of the sensor sheet is frequently changed. However, in general, in a relatively large electronic device, such a change in the disposition cannot be easily flexibly realized when there is a desire to change the form of a specific portion, such as a touch sensor member.

Solution to Problem

Several aspects that are disclosed in the present application are provided to have the following features.

That is, one aspect that is disclosed in the present application is a decorative panel including a panel member that has an opening portion; a touch sensor member that is disposed at the opening portion; and a covering member that covers the panel member and the touch sensor member, and that has a movable portion that supports the touch sensor member so that the touch sensor member is displaceable with respect to the panel member.

One aspect that is disclosed in the present application is, from a different viewpoint, a decorative panel having a panel member that has a peripheral edge that forms an opening portion, a touch sensor member that is separated from the panel member and that is disposed at the opening portion, and a covering member that integrally covers an outer-side surface of the panel member and an operation-surface-side surface of the touch sensor member. The covering member has a flexible laying portion that serves as a bridge between the panel member and the touch sensor member. The touch sensor member is disposed so as to be spaced from the peripheral edge and so as to be displaceable with respect to the panel member.

One aspect that is disclosed in the present application is, from a still different viewpoint, a decorative panel having a panel member that has a peripheral edge that forms an opening portion, a touch sensor member that is separated from the panel member and that is disposed at the opening portion so as to be displaceable with respect to the panel member, and a covering member that covers an outer-side surface of the panel member and an operation-surface-side surface of the touch sensor member. The covering member has a flexible laying portion that serves as a bridge between the panel member and the touch sensor member. The covering member integrally covers the panel member and the touch sensor member that is disposed so as to be spaced from the peripheral edge.

In one aspect of the present disclosure, the panel member has an opening portion and the touch sensor member is separated from the panel member. Therefore, according to the one aspect of the present disclosure, the touch sensor member can be disposed at the opening portion formed at a desired position in the panel member. Consequently, according to the one aspect of the present disclosure, for example, it is possible to dispose the touch sensor member with a large degree of freedom with respect to a large component, such as an instrument panel that is an interior component of a car. Further, according to the one aspect of the present disclosure, the opening portion only needs to be formed in the panel member in accordance with the position where the touch sensor member is to be provided. Therefore, for example, when the entire shape of the panel member is the same and the position of the touch sensor member differs, the panel member can be used in common.

Further, in one aspect of the present disclosure, the touch sensor member is disposed so as to be spaced from the peripheral edge of the opening portion of the panel member and so as to be displaceable with respect to the panel member. Therefore, according to the one aspect of the present disclosure, it is possible to perform a push-in input operation on the touch sensor member with respect to the panel member.

In one aspect of the present disclosure, the covering member integrally covers the touch sensor member and the panel member that are disposed so as to be spaced from each other. Therefore, according to the one aspect of the present disclosure, it is possible to realize an external appearance without a joint of the covering member while a gap is formed between the touch sensor member and the panel member. Consequently, according to the one aspect of the present disclosure, the graphic design function of the decorative panel can be enhanced.

In one aspect of the present disclosure, the touch sensor member may have a resin molded body, and a film substrate where an electrode part and a circuit of a capacitive sensor are mounted, and the touch sensor member may have the film substrate at least one of a front surface and a back surface of the resin molded body.

In one aspect of the present disclosure, the touch sensor member has, at the front surface of the resin molded body, the film substrate where an electrode part and a circuit of the capacitive sensor are mounted. That is, in the one aspect of the present disclosure, the touch sensor member is formed by combining a resin molded body and a film substrate, the resin molded body forming a structure that allows a push-in input operation to be performed with respect to the panel member, the film substrate having a touch sensor function. Therefore, according to the one aspect of the present disclosure, the touch sensor member can have a touch function at a front-side surface of the resin molded body and a push-in input operation function with respect to the panel member.

In one aspect of the present disclosure, the touch sensor member may have, at the front surface, an uneven shape including a protruding portion, and the electrode part may be disposed along a standing wall surface that is formed at a side portion of the protruding portion.

In one aspect of the present disclosure, the touch sensor member has a protruding portion at its front surface, and the electrode part is disposed along the protruding portion. Therefore, according to the one aspect of the present disclosure, the touch sensor member is capable of guiding a movement operation by a user along the protruding portion and detecting a change in the capacitance of the electrode part disposed along the protruding portion. Consequently, according to the one aspect of the present disclosure, it is possible to allow an input operation of choosing one from among a plurality of choices or adjusting the quantity.

In one aspect of the present disclosure, the panel member may have, at a peripheral edge that forms the opening portion, a first non-fixed region that is not fixed to the covering member.

On the other hand, in one aspect of the present disclosure, the touch sensor member may have a second non-fixed region that is not fixed to the movable portion that is positioned at the opening portion.

In one aspect of the present disclosure, the panel member has, at the peripheral edge that forms the opening portion, a first non-fixed region that is not fixed to the covering member. On the other hand, in one aspect of the present disclosure, the touch sensor member has a second non-fixed region that is not fixed to the movable portion that is positioned at the opening portion. Therefore, in the each aspect of the present disclosure, when the touch sensor member is displaced with respect to the panel member, the non-fixed regions can move away therefrom instead of the covering member being deformed by being extended and contracted in response to a relative displacement between the panel member and the touch sensor member. Consequently, in each aspect of the present disclosure, the covering member does not act to resist the displacement of the touch sensor member with respect to the panel member caused by a push-in input operation, and thus the touch sensor member can be easily pushed.

In one aspect of the present disclosure, the decorative panel may further include a shock-absorbing body, and the shock-absorbing body may be disposed at a peripheral edge of the opening portion.

On the other hand, in one aspect of the present disclosure, the decorative panel may further include a shock-absorbing body, and the shock-absorbing body may be disposed at the touch sensor member so as to oppose a peripheral edge of the opening portion.

In one aspect of the present disclosure, a shock-absorbing body is disposed at the peripheral edge of the opening portion. On the other hand, in one aspect of the present disclosure, the shock-absorbing body is disposed at the touch sensor member so as to oppose the peripheral edge. Therefore, according to each aspect of the present disclosure, the shock-absorbing body absorbs vibration generated at one of the panel member and the touch sensor member and makes it difficult for the vibration to be transmitted to the other of the panel member and the touch sensor member. Consequently, according to each aspect of the present disclosure, in particular, it is possible to end the vibration that is generated at the touch sensor member in the inside thereof and to reduce the vibration of the panel member.

In one aspect of the present disclosure, the decorative panel may further include a vibration generating member that vibrates the touch sensor member.

In one aspect of the present disclosure, the decorative panel further has a vibration generating member that vibrates the touch sensor member. Therefore, according to the one aspect of the present disclosure, for example, as tactile (cutaneous sensation) feedback at the time of an operation, the touch sensor member can be vibrated as required. Consequently, according to the one aspect of the present disclosure, it is possible to indicate to a user that an input operation has been reliably performed on the touch sensor member. Since the touch sensor member here is separated from the panel member, the vibration generating member is capable of vibrating only the touch sensor member. Thus, according to the one aspect of the present disclosure, the touch sensor member can be efficiently vibrated.

In one aspect of the present disclosure, the decorative panel may further include a receiving portion that receives the touch sensor member, and the touch sensor member may be configured to be attachable to and detachable from the receiving portion.

If it becomes necessary to replace a touch sensor member that is not attachable to or detachable from the decorative panel, either the entire decorative panel is replaced or the touch sensor member is separated from the covering member. However, replacing the entire decorative panel for replacing the touch sensor member is uneconomical. On the other hand, if the touch sensor member is to be separated from the covering member, it is desirable that there be excellent re-separability (re-workability) between the touch sensor member and the covering member, whereas, in general, the reliability of adhesion on the contrary tends to be reduced. Further, after the touch sensor member has been separated from the covering member, it is not easy to attach a different touch sensor member to the covering member so as to prevent entry of a foreign substance such as air.

In contrast, in one aspect of the present disclosure, the decorative panel further has a receiving portion that receives the touch sensor member, and the touch sensor member is attachable to and detachable from the receiving portion. Therefore, according to the one aspect of the present disclosure, when the touch sensor member needs to be replaced, the touch sensor member can be replaced with the decorative panel remaining as it is. Consequently, in the one aspect of the present disclosure, the reliability of the touch sensor member can be ensured while reducing ineffectiveness in replacing the touch sensor member.

DESCRIPTION OF EMBODIMENTS

Figure 1:
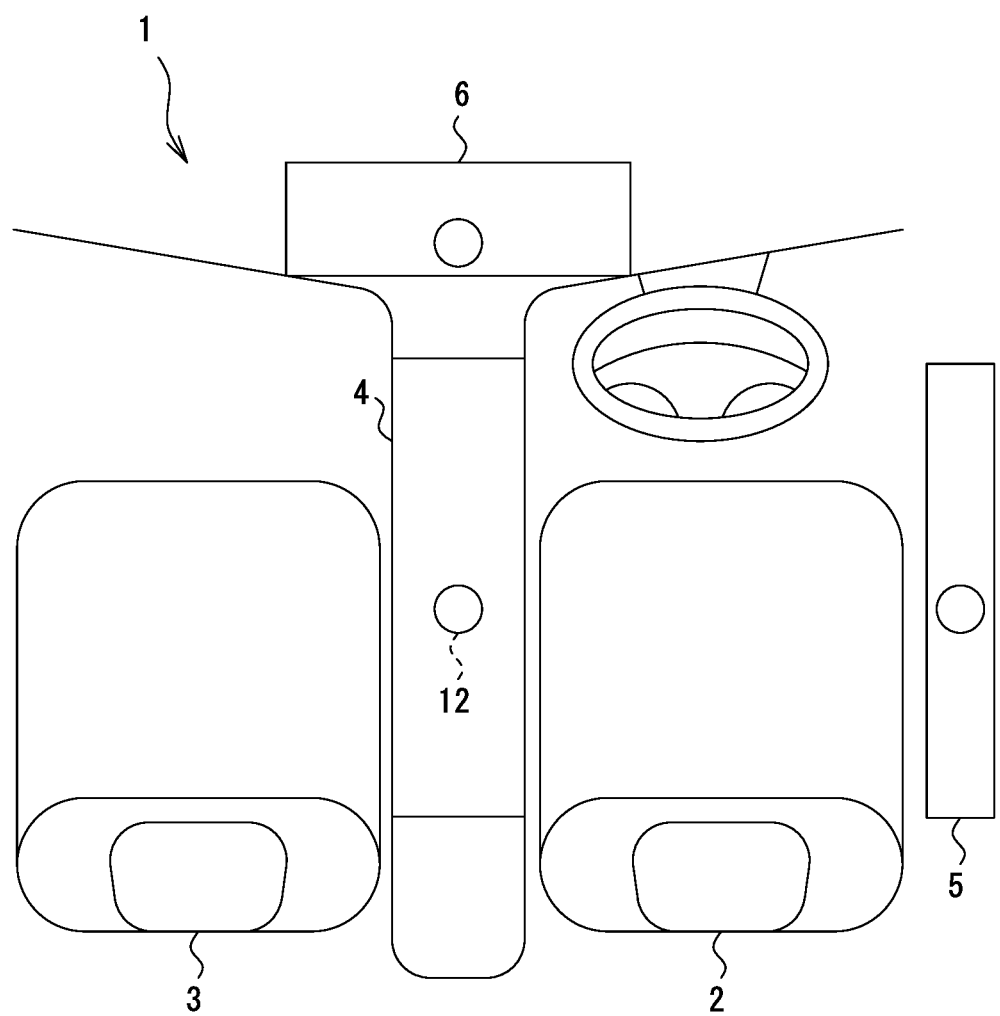
FIG. 1 is a plan view of a car and shows an example of an application of a touch-sensor integrated panel according to a first embodiment.

Embodiments that are disclosed in the present application are described below with reference to the drawings. Common structures in the embodiments below are given the same reference numerals, and overlapping explanations in the description are omitted. Further, overlapping explanations about methods of use and operational effects that are common in the embodiments are omitted. Here, in the description and the claims, "first" and "second" are used for distinguishing different structural elements, and are not used to indicate, for example, a specific order or superiority or inferiority.

"Decorative panel" that is disclosed in the present application is an input device that is operated by, primarily, a finger I of a user for performing a desired function, and, compared with an input unit, is used in an electronic device in which, for example, a substrate, a housing, or a container, provided with the input unit, is relatively large. As one form of the "decorative panel", a "vehicle-installed interior panel", more specifically, a "vehicle-installed interior panel including a touch sensor" can be exemplified. As shown in FIG. 1, various types of large "vehicle-installed interior panels" are provided around a driver's seat 2 and a passenger seat 3 of a car 1. Examples of "vehicle-installed interior panels" or "vehicle-installed interior panels including a touch sensor" are, as shown in FIG. 1, an armrest part 4 of a center console, an armrest part 5 of a door, and an instrument panel 6. Here, an embodiment of, for example, a touch-sensor integrated panel 10 used in the armrest part 4 of the center console is described with reference to the drawings.

Figure 2:
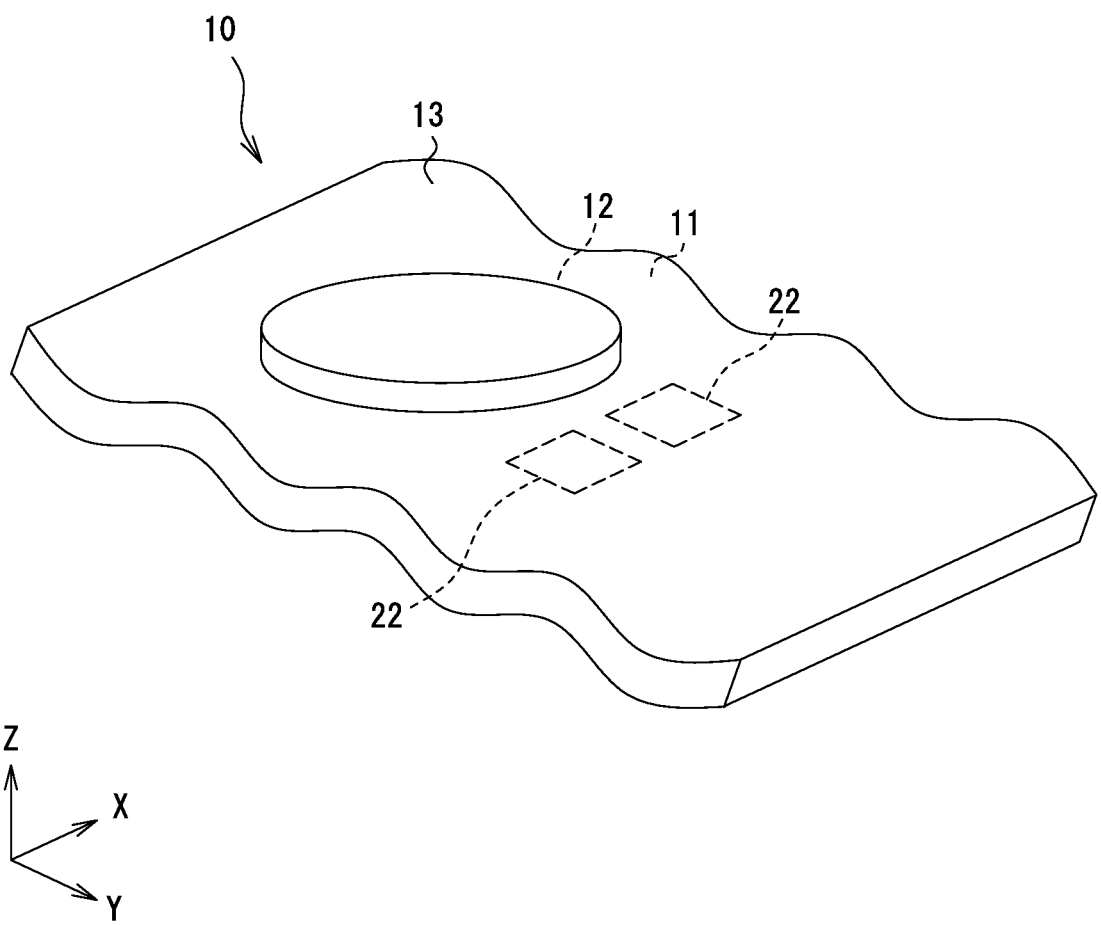
FIG. 2 is a perspective view showing an external appearance of the touch-sensor integrated panel according to the first embodiment.

In the description and the claims, for convenience sake, as shown in, for example, FIG. 2, a left-right direction of the touch-sensor integrated panel 10, serving as the "decorative panel", is described as an X direction, a front-rear direction thereof is described as a Y direction, and a height direction (up-down direction) is described as a Z direction. Further, in the touch-sensor integrated panel 10 shown in FIG. 2, a side where a cover panel member 11, serving as a "panel member", is placed is described as a lower side (back side) in the Z direction, and a side where a touch sensor member 12 protrudes is described as an upper side (front side) in the Z direction. However, these directions do not limit, for example, the direction of disposition of the touch-sensor integrated panel 10 and a push-in input operation direction of the touch sensor member 12.

Figure 3:
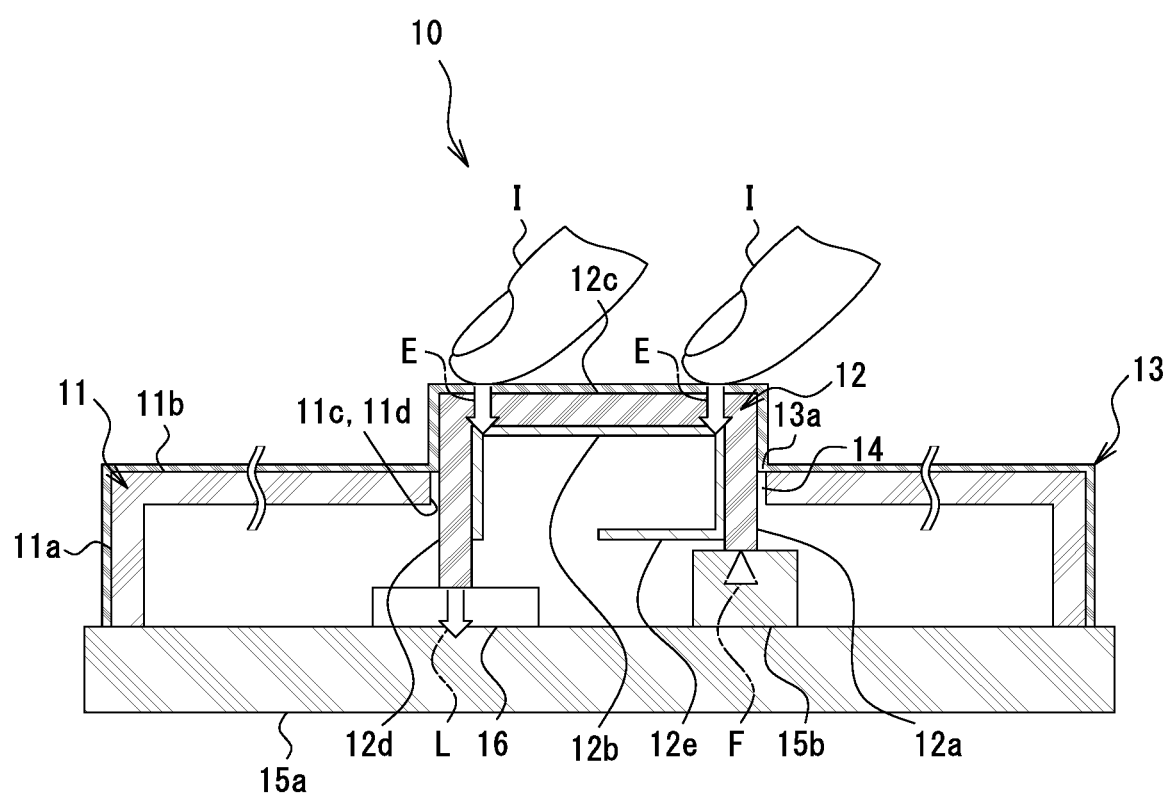
FIG. 3 is a sectional view showing a direction of intersection with respect to a push-in input operation direction of a touch sensor member of the touch-sensor integrated panel according to the first embodiment.

First Embodiment (FIG. 1 to FIG. 3)

As shown in FIG. 2, the touch-sensor integrated panel 10 has a form in which an outer frame thereof protrudes toward a lower surface side with respect to a plane of the panel, and has a flat shape that is much shorter in the Z direction than in the X direction and the Y direction. The touch-sensor integrated panel 10 has, on its upper portion, a surface that is longer in the X direction than in the Y direction and that is larger than the touch sensor member 12 along an XY plane (horizontal direction). The X direction and the Y direction here are exemplifications, and the touch-sensor integrated panel 10 may be formed longer in the Y direction than in the X direction.

As shown in FIG. 3, the touch-sensor integrated panel 10 of the present embodiment has a cover panel member 11, a touch sensor member 12, and a design film 13 serving as a "covering member". The touch-sensor integrated panel 10 has a structure in which upper surfaces of both the cover panel member 11 and the touch sensor member 12 in the Z direction are covered by the design film 13. That is, as shown in FIGS. 2 and 3, the design film 13 spreads over and covers an upper surface in the Z direction of the touch-sensor integrated panel 10 of the present embodiment, and though the contours of the touch sensor member 12 and the cover panel member 11 appear, they are not exposed.

The cover panel member 11 is a part that is a base of the structure of the touch-sensor integrated panel 10. The cover panel member 11 has a frame body 11a and a top plate 11b. The frame body 11a is a part for supporting the top plate 11b and forming a space inside the cover panel member 11. The frame body 11a has a plate shape extending downward in the Z direction from an outer peripheral edge of the top plate 11b. The frame body 11a may be formed so as to extend from the middle of the top plate 11b in the X direction and the Y direction instead of from the outer peripheral edge of the top plate 11b. Therefore, even if the cover panel member 11 is large, deformation such as that occurring when the top plate 11b is recessed toward the space inside the cover panel member 11 is unlikely to occur, as a result of which the structure of the cover panel member 11 can be reinforced.

The top plate 11b has a plate thickness in the Z direction, and has a plate shape having a surface along the XY plane. The shape of the surface of the top plate 11b is not particularly limited, and the surface of the top plate 11b may be further curved in the Z direction (plate-thickness direction). That is, the top plate 11b can be formed so that, in the plate-thickness direction thereof, the entire top plate 11b has a curved shape or one or a plurality of portions thereof have a curved shape. The top plate 11b is raised in the Z direction by the frame body 11a that is positioned at the outer peripheral edge of the top plate 11b, and a space surrounded by the top plate 11b and the frame body 11a is formed below the top plate 11b and inward of the frame body 11a.

An opening portion 11c extending in the Z direction through the surface, which extends along the XY plane, of the top plate 11b is formed in the top plate 11b. The touch sensor member 12 is disposed in the opening portion 11c. An inner edge 11d serving as a "peripheral edge" that forms the opening portion 11c of the top plate lib has, for example, a circular shape in plan view. The shape of the inner edge 11d only needs to be one that allows the touch sensor member 12 to be accommodated in the opening portion 11c, and may be, for example, a polygonal shape, an elliptical shape, or an indeterminate shape in plan view.

The touch sensor member 12 has the function of detecting that primarily a finger I of a user has touched the touch sensor member 12. A capacitive method (projected capacitive method) is used in detecting a touch operation of the touch sensor member 12. However, the method used in the touch sensor member 12 is not limited thereto, and thus a resistive film method, an ultrasonic method, or various other methods can be used.

The touch sensor member 12 is a member that is separate from the cover panel member 11, and is separated from the cover panel member 11. Therefore, in the touch-sensor integrated panel 10, a capacitive sensor need not be directly integrated with the cover panel member 11 that is, for example, a large housing panel.

The touch sensor member 12 separated from the cover panel member 11 is disposed in the opening portion 11c that is formed in the cover panel member 11. Therefore, in the touch-sensor integrated panel 10, the touch sensor member 12 can be disposed in the opening portion 11c formed at a desired position in the cover panel member 11. Consequently, according to the present embodiment, for example, the touch sensor member 12 can be disposed with a large degree of freedom with respect to a large component such as the armrest part 4 of a center console that is an interior component of the car 1. Further, in the touch-sensor integrated panel 10, an opening (opening portion 11c) only needs to be formed in the cover panel member 11 in accordance with the position where the touch sensor member 12 is to be provided. Therefore, according to the present embodiment, for example, when the shape of the entire panel member 11 is the same and the position of the touch sensor member 12 differs, the cover panel member 11 can be used in common. To be more specific, a plurality of opening portions 11c can be formed in the cover panel member 11, and the position where the touch sensor member 12 is provided can be changed. For example, in a first car model, the touch sensor member 12 can be disposed in one or any one of a plurality of first opening portions 11c, and a closing member (resin molded body) that closes an opening of one or a plurality of second opening portions 11c can be disposed in the one or the plurality of second openings 11c so that the touch sensor member 12 is not disposed therein. In contrast, in a second car model, the touch sensor member 12 can be disposed in the one or any one of the plurality of second opening portions 11c, and the closing member (resin molded body) that closes the opening of the one or the plurality of first opening portions 11c can be disposed in the one or the plurality of first opening portions 11c so that the touch sensor member 12 is not disposed therein. According to such a touch-sensor integrated panel 10, in accordance with, for example, the car model, the interior type, or the function realized by the touch sensor member 12, it is possible to change, for example, the disposition and the type of touch sensor member 12 while using the cover panel member 11 in common.

The touch sensor member 12 has a resin molded body 12a and a film substrate 12b where an electrode part and a circuit of a capacitive sensor are mounted. The resin molded body 12a has on its upper end a surface extending along the XY plane, and has a shape extending along the Z direction. The resin molded body 12a has an upper plate portion 12c and a standing wall portion 12d.

The upper plate portion 12c has a plate thickness in the Z direction, and has a plate shape having a surface extending along the XY plane. The upper plate portion 12c has, for example, a circular shape in plan view. However, the shape of the upper plate portion 12c may be, for example, a polygonal shape, an elliptical shape, or an indeterminate shape in plan view. The standing wall portion 12d extends downward in the Z direction from an outer peripheral edge of the upper plate portion 12c and has a plate shape having a "standing wall surface" on each of an outer peripheral side and an inner peripheral side. A space surrounded by the upper plate portion 12c and the standing wall portion 12d is formed below the upper plate portion 12c and inward of the standing wall portion 12d. The space communicates with a space formed inward of the cover panel member 11.

The upper plate portion 12c of the resin molded body 12a is positioned above the top plate 11b of the cover panel member 11. That is, the resin molded body 12a has a three-dimensional shape having a "protruding portion" above the cover panel member 11. Since the touch sensor member 12 formed by the resin molded body 12a is a hollow structure, the plate thickness of the upper plate portion 12c can be made small. Therefore, the distance from the finger I that performs an input operation to the capacitive sensor can be decreased.

The touch sensor member 12 is disposed with a certain gap 14 with respect to the inner edge 11d of the opening portion 11c of the cover panel member 11 around the outer peripheral edge of the upper plate portion 12c and an outer peripheral edge of the standing wall portion 12d. Therefore, in the touch-sensor integrated panel 10, the cover panel member 11 is disposed at an outer periphery of the gap 14 and the touch sensor member 12 is disposed at an inner periphery of the gap 14. Consequently, in the opening portion 11c, the touch sensor member 12 is disposed so as to be smoothly displaceable in the Z direction without striking the cover panel member 11.

In this way, in the touch-sensor integrated panel 10, the touch sensor member 12 is disposed so as to be displaceable with respect to the cover panel member 11 with a space corresponding to the gap 14 being formed between the touch sensor member 12 and the inner edge 11d of the opening portion 11c of the cover panel member 11. Therefore, according to the present embodiment, it is possible to perform a push-in input operation on the touch sensor member 12 with respect to the cover panel member 11.

As shown in FIG. 3, the film substrate 12b is disposed on a back-side surface (lower surface, inner surface) of the upper plate portion 12c. More specifically, as shown in FIG. 3, the film substrate 12b is disposed so as to extend along the standing wall portion 12d on one side in the X direction, the upper plate portion 12c, and the standing wall portion 12d on a side opposing the one side in the X direction. The electrode part of the capacitive sensor is disposed in accordance with the position of an "input operation unit" at a front-side surface of the touch-sensor integrated panel 10. The film substrate 12b only needs to be disposed at least one of a front surface and a back surface of the resin molded body 12a. That is, the film substrate 12b only needs to be disposed at a front-side surface (outer surface) or a back-side surface (inner surface) of the upper plate portion 12c. A tail portion 12e extends from the film substrate 12b. A circuit wire extending from the electrode part of the film substrate 12b having the capacitive sensor is formed at the tail portion 12e. The tail portion 12e has, at its end, a connection portion that is connected to a substrate where a touch sensor IC is mounted.

In this way, in the touch-sensor integrated panel 10, the touch sensor member 12 has, on at least one of the front surface and the back surface (for example, a back-side surface) of the resin molded body 12a, the film substrate 12b where the electrode part and the circuit of the capacitive sensor are mounted. That is, the touch sensor member 12 is formed by combining the resin molded body 12a and the film substrate 12b, the resin molded body 12a forming a structure that allows a push-in input operation to be performed with respect to the cover panel member 11, the film substrate 12b having a touch sensor function. Therefore, according to the present embodiment, the touch sensor member 12 can have a touch function at a front-side surface of the resin molded body 12a and a push-in input operation function with respect to the cover panel member 11.

The design film 13 is a part that covers an outer surface of the touch-sensor integrated panel 10 and protects other members contained therein, and that informs a user about, for example, a pattern or functions of the touch-sensor integrated panel 10. The design film 13 has a thickness in the Z direction, and has a film shape having a surface extending along the XY plane in a large part thereof. The design film 13 has a movable portion 13a.

The design film 13 integrally covers an outer surface, which is an upper surface, of the cover panel member 11 and an operation-surface-side surface, which is an upper surface, of the touch sensor member 12. More specifically, the design film 13 integrally covers a front-side surface of each of the frame body 11a, the top plate 11b, the gap 14, and the upper plate portion 12c and the standing wall portion 12d at the "protruding portion". Here, the design film 13 hides the gap 14 from both sides thereof. The touch sensor member 12 and the cover panel member 11 that are disposed with the gap 14 therebetween is connected to and integrated with each other by the design film 13 that covers and connects front-side surfaces of these members.

In this way, the design film 13 integrally covers the outer surface of the cover panel member 11 and the operation-surface-side surface of the touch sensor member 12 that are disposed with the gap 14 therebetween. Therefore, according to the present embodiment, it is possible to realize an external appearance without a joint of the design film 13 while the gap 14 is formed between the cover panel member 11 and the touch sensor member 12. Consequently, according to the present embodiment, the graphic design function of the touch-sensor integrated panel 10 can be enhanced.

The movable portion 13a is a part that supports the touch sensor member 12 so that the touch sensor member 12 is displaceable with respect to the cover panel member 11. From a different viewpoint, the movable portion 13a is a flexible "laying portion" that serves as a bridge between the cover panel member 11 and the touch sensor member 12. Since the movable portion 13a is provided between the cover panel member 11 and the touch sensor member 12 having a "protruding portion", as shown in FIG. 3, the movable portion 13a has an L-shape shape (shape having a right angle) in cross section. The movable portion 13a is a portion of the design film 13 that is positioned at the gap 14 and is bendably formed. Therefore, in the touch-sensor integrated panel 10, the movable portion 13a can be bent by pushing in the touch sensor member 12 with respect to the cover panel member 11 to push in the touch sensor member 12 in a downward direction that is a vertical direction with respect to the front-side surface. When the pushing is stopped, the movable portion 13a is restored. Consequently, the touch sensor member 12 can be moved in an upward direction that is the vertical direction.

For the design film 13, for example, a soft film member is used. The design film 13 may have a pattern or a decorative layer in its entirety, and may have an indicator, such as a character or a symbol, at the position of the "input operation unit". In the design film 13, since, in particular, the "input operation unit" is optically transparent, the indicator, such as a character or a symbol, may be illuminated by being irradiated with a backlight. Further, in the design film 13, when the vicinity of the indicator, such a character or a symbol, is shielded from light, the illuminated indicator can stand out. The indicator, such as a pattern, a decorative layer, a character, or a symbol, becomes a "decorating layer" of the design film 13. The decorating layer can be formed as a print layer provided on a front surface or a back surface of a base film forming the design film 13. The design film 13 may be provided with a protective layer for protecting the print layer serving as the decorating layer. The design film 13 may have a structure in which a decorating film having the decorating layer is stacked on the base film. Alternatively, in the design film 13, a deformable portion (such as the movable portion 13a) may be formed from only an easily bendable base film, and a portion other than the deformable portion may have a structure in which the base film and one or a plurality of functional films (decorating function, protecting function, durability increasing function) are stacked upon each other.

A base material 15a can be disposed below the cover panel member 11 and the touch sensor member 12. For example, a wiring board or a resin base material is used for the base material 15a. Further, as shown in FIG. 3, a foundation 15b that protrudes upward is formed on the base material 15a. The foundation 15b is disposed on one side in the X direction, here, on the right side. The foundation 15b is provided at a position that overlaps in plan view a lower end surface of the standing wall portion 12d of the touch sensor member 12. A lower end surface in a region on the right side in the X direction of the standing wall portion 12d, the lower end surface being a part of a lower end surface of the touch sensor member 12, is placed on the foundation 15b.

Further, as shown in FIG. 3, a membrane switch 16, serving as an "input switch", is provided on the base material 15a. The membrane switch 16 is disposed with a pair of thin-film electrode circuits in an opposing state. Since the membrane switch 16 hardly has a stroke when being operated, the touch-sensor integrated panel 10 can be thin, which is preferable. Further, since the membrane switch 16 is often of a type does not provide a tactile sensation (clicking feel) at the time of an input operation, when the membrane switch 16 is used at, for example, a place where vibration occurs, an input operation result and vibration are distinguishable, which is favorable. However, in the touch-sensor integrated panel 10, in place of the membrane switch 16, for example, a push-button switch or a tact switch can be used as the "input switch" that allows an input operation.

The membrane switch 16 is disposed on the other side in the X direction, here, on the left side. The membrane switch 16 is provided at a position that overlaps in plan view a lower end surface of the standing wall portion 12d of the touch sensor member 12. A lower end surface in a region on the left side in the X direction of the standing wall portion 12d, the lower end surface being a part of the lower end surface of the touch sensor member 12, is placed on the membrane switch 16.

In this case, the foundation 15b serves as a fulcrum F that supports one part of the lower end surface of the touch sensor member 12. In this way, a lever is formed at the touch-sensor integrated panel 10, the lever having an effort E where the finger I of a user performs a push-in input operation on an operation surface of the design film 13, the fulcrum F at the foundation 15b, and a load L where the other part of the lower end surface of the touch sensor member 12 pushes down the membrane switch 16. Therefore, in the touch-sensor integrated panel 10 where the foundation 15b is disposed, the principle of "leverage" makes it easier for a large force to be transmitted to the membrane switch 16 from the operation surface of the design film 13 on which a push-in input operation is performed by the finger I of the user.

The touch sensor member 12 may be placed on a flat surface that is at the same height as the base material 15a without forming the foundation 15b on the base material 15a. In this case, since the distance between the effort E, where the finger I of a user performs a push-in input operation on the operation surface of the design film 13, and the fulcrum F on the base material 15a is increased, a force that is transmitted to the membrane switch 16 is increased accordingly.

In order to smoothly displace the touch sensor member 12 with respect to the cover panel member 11, the gap 14 between the cover panel member 11 and the touch sensor member 12 is preferably 0.05 mm to 5.0 mm, and more preferably 0.1 mm to 1.0 mm. When the gap 14 is wider than 0.05 mm, the touch sensor member 12 can be smoothly pushed in without the cover panel member 11 and the touch sensor member 12 colliding with each other at the time of an input operation. On the other hand, when the gap 14 is narrower than 5.0 mm, since the gap 14 that is covered by the design film 13 is not large and the position of the gap 14 from above the design film 13 is not easily seen, this is preferable from the viewpoint of external appearance.

As the material of the design film 13, soft resin or rubber is used. If thermoplastic resin is used, the resin is heated and softened and deformed in accordance with a surface shape of each of the cover panel member 11 and the touch sensor member 12, to integrally mold them. As the material of the design film 13, another material such as a cloth, a fabric, an unwoven fabric, a net-like material, or a mesh sheet can also be used. For a material whose gap between fibers is large, when, for example, soft resin films or unwoven fabrics with fine meshes are stacked, gaps are eliminated, which is preferable. Therefore, a decorative panel in which a ground design pattern of a cloth or the like appears at a front surface of the design film 13 is realized.

For the design film 13, for example, a film made of a thermoplastic resin or a thermoplastic elastomer can be used. When the design film 13 is made of a thermoplastic resin, it is preferable that its hardness be D10 to D70 (values measured by a type D durometer in conformity with JISK7215:1986) and its thickness be 0.05 mm to 1.0 mm. Therefore, the design film 13 is bendably deformable. When the design film 13 is made of a thermoplastic elastomer, it is preferable that its hardness be A40 to A95 (values measured by a type A durometer in conformity with JISK6253:2012) and its thickness be 0.05 mm to 3.0 mm. Therefore, the design film 13 is bendably deformable. When the hardness of the design film 13 is small, the input operation surface also becomes soft, and thus the finger I can feel the input when pushing in the input operation surface.

In this way, in the touch-sensor integrated panel 10 of the present embodiment, the cover panel member 11 and the touch sensor member 12 are arranged on a film surface of the design film 13 and thus form an integrated structural body in which they are connected by the design film 13. In the touch-sensor integrated panel 10, since the gap 14 between the members is covered by the design film 13, the gap 14 does not appear externally from the front-side surface, and thus there can be uniformity in the design. In the touch-sensor integrated panel 10, since moisture or dust does not enter from the gap 14, it is possible to protect the capacitive sensor and other electronic components inside the touch-sensor integrated panel 10.

In the touch-sensor integrated panel 10, the shape of the resin molded body 12a of the touch sensor member 12 and the circuit design of the capacitive sensor may be changed. However, in the touch-sensor integrated panel 10, since the touch sensor member 12 is separated from the cover panel member 11, it is sufficient to only change, for example, a printing plate or a molding die for obtaining the touch sensor member 12. Further, the position of the touch sensor member 12 inside the cover panel member 11 may be changed. However, in the touch-sensor integrated panel 10, an opening (opening portion 11c) only needs to be formed in the cover panel member 11 in accordance with the position where the touch sensor member 12 is to be provided. Therefore, according to the present embodiment, even when the specification of the touch sensor member 12 has been changed, it becomes no longer necessary to change a molding die of the entire touch-sensor integrated panel 10.

Method of Manufacturing Touch-Sensor Integrated Panel 10

By forming an electrode part and a circuit on a base-material film by using a method such as printing or metal etching, the film substrate 12b having a capacitive sensor is obtained. The electrode part and the circuit can be formed on a front surface or a back surface or both surfaces of the base-material film. Next, the resin molded body 12a, which becomes the touch sensor member 12, and the film substrate 12b are integrated with each other. The resin molded body 12a is made of a hard resin. The resin molded body 12a may be previously formed before being integrated with the film substrate 12b, or may be formed at the same time as its integration with the film substrate 12b. The resin molded body 12a and the film substrate 12b can be integrated with each other by, for example, bonding using a double-sided adhesive tape or an adhesive, insert molding, or vacuum molding.

Next, the cover panel member 11 is formed by molding. The cover panel member 11 is molded out of a hard resin. The cover panel member 11 is a housing panel that is larger than the touch sensor member 12. The cover panel member 11 is provided with an opening (opening portion 11c) where the touch sensor is to be disposed. The cover panel member 11 is disposed so that the opening portion 11c matches the position of the touch sensor member 12. Here, the cover panel member 11 is adjusted so that the inner edge 11d of the opening portion 11c is disposed around the touch sensor member 12 via the certain gap 14.

Next, the design film 13 is formed. First, a character or a symbol, a pattern, or a decoration is formed on a base film, which is a substratum of the design film 13, by using printing, coating, or the like. A pattern or the like can be provided on the design film 13 by a processing operation of forming a surface of the base film with a fine uneven shape.

The design film 13 is integrally molded so as to cover the front-side surface of each of the cover panel member 11 and the touch sensor member 12 that have been positioned. Since the design film 13 is made of a thermoplastic material, the design film 13 is formed with a shape that follows the shape of a surface of each member. The design film 13 may have, at a region where the cover panel member 11 and the touch sensor member 12 are to be adhered, an adherence layer having an adhesive or the like. For integrally molding the cover panel member 11 and the touch sensor member 12 with the design film 13, vacuum molding, pressure molding, vacuum pressure molding, or TOM (three dimension overlay method) molding can be preferably used. Alternatively, press molding, laminate molding, insert molding, or in-mold molding can also be used for integrally molding them.

Figure 4:
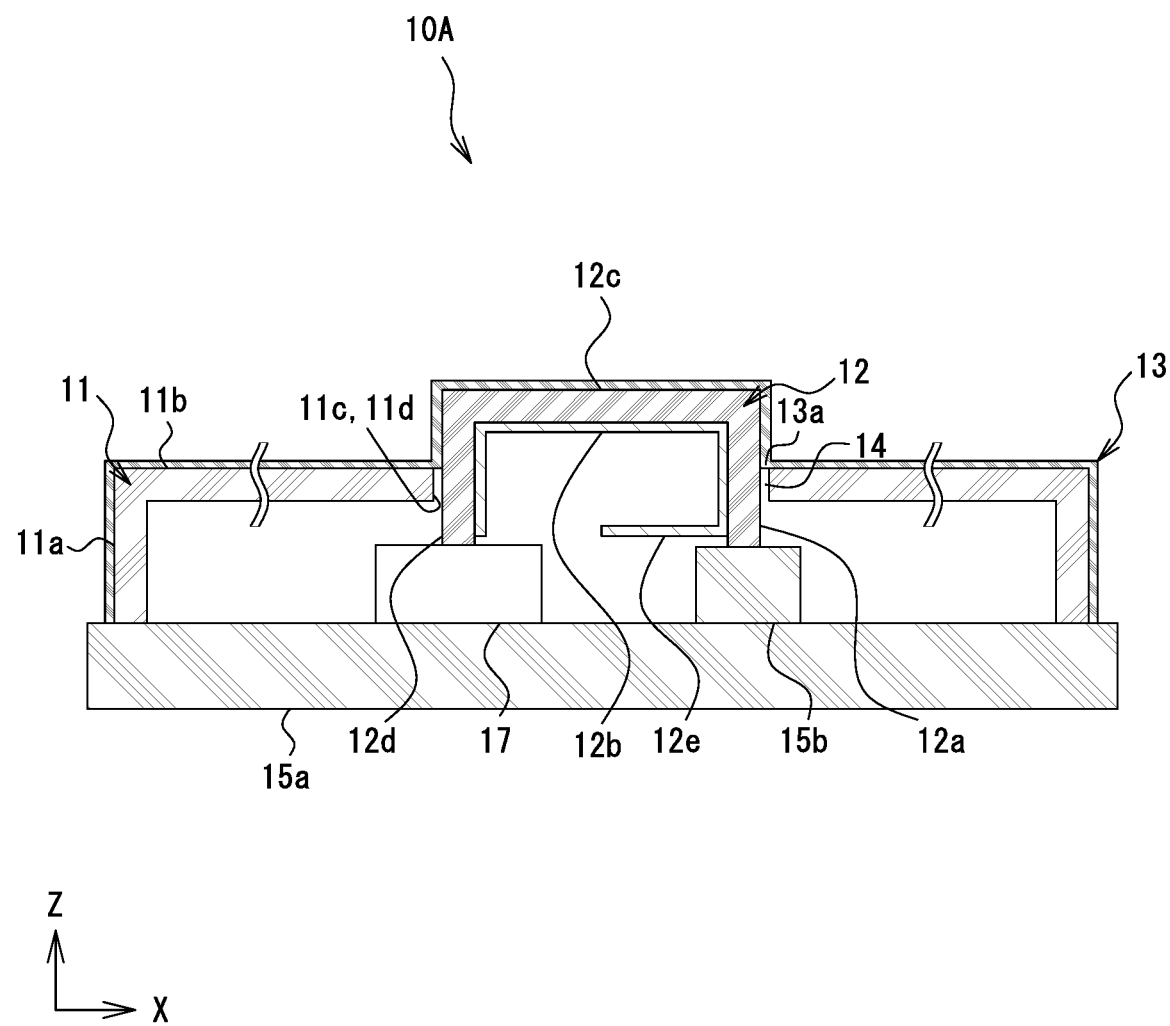
FIG. 4 is a sectional view, equivalent to FIG. 3, showing a touch-sensor integrated panel according to a modification of the first embodiment.
Figure 5:
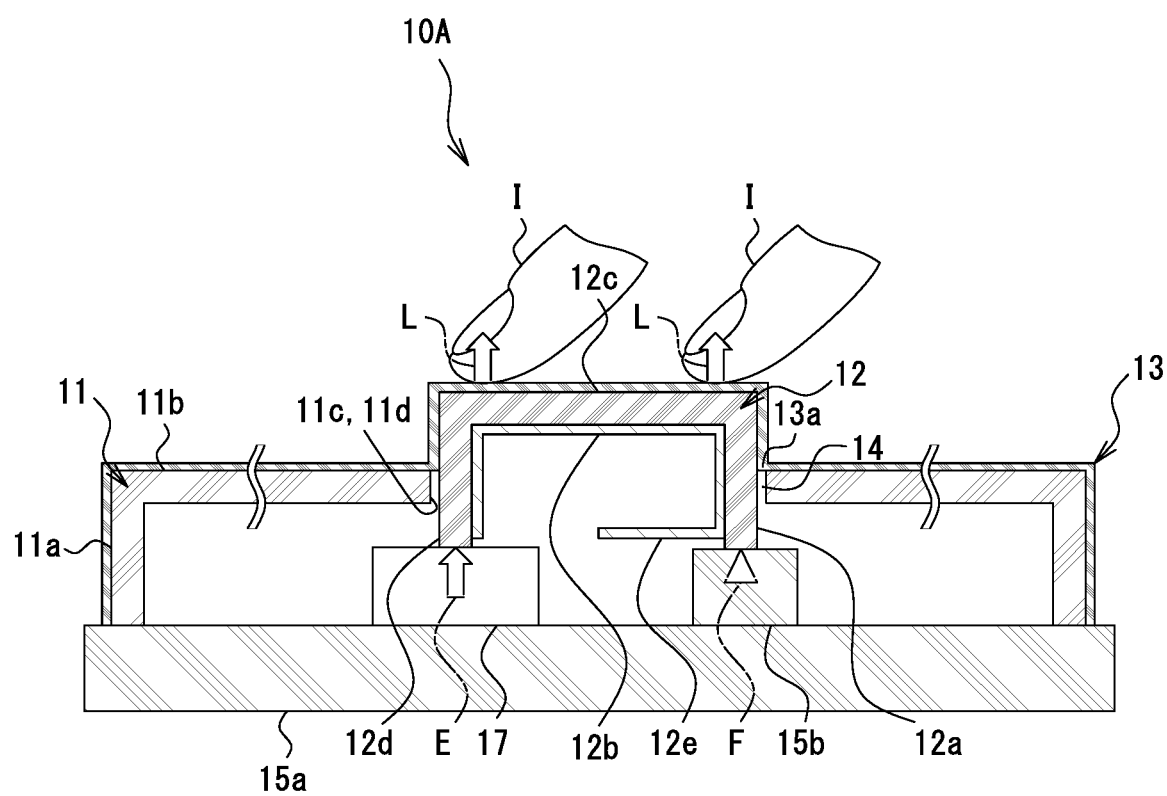
FIG. 5 is a sectional view, equivalent to FIG. 3, showing an action of the touch-sensor integrated panel according to the modification of the first embodiment.
Figure 6:
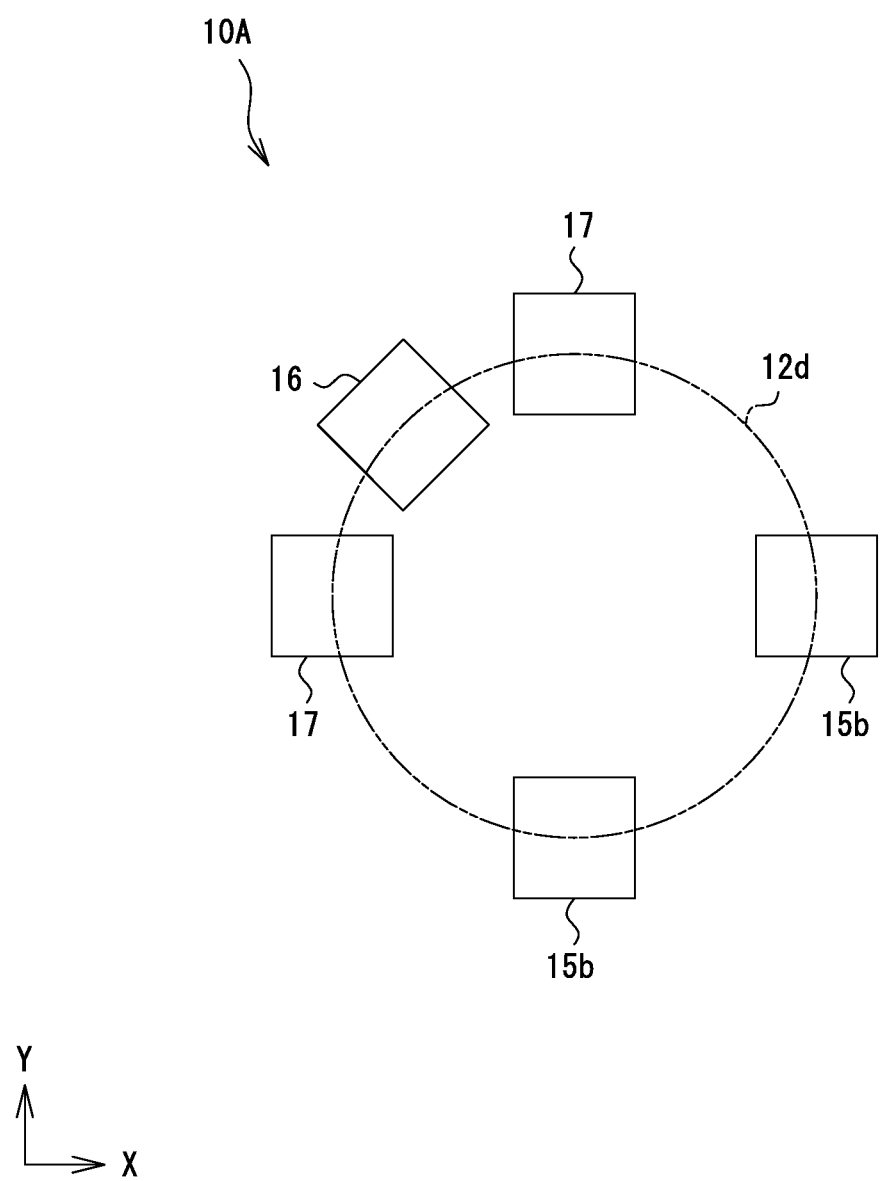
FIG. 6 is a plan view schematically showing an example of a disposition of the touch-sensor integrated panel according to the modification of the first embodiment.

Modification of First Embodiment (FIG. 4 to FIG. 6)

Since the touch-sensor integrated panel 10 of the present embodiment can be modified, an example thereof is described.

A touch-sensor integrated panel 10A of a modification of the present embodiment may further have a piezoelectric element 17 serving as a "vibration generating member" that vibrates (displaces) the touch sensor member 12. The piezoelectric element 17 here has, for example, the function of a haptic device, in which the piezoelectric element 17 itself vibrates in accordance with an input operation of a user and the vibration is transmitted to primarily the finger I of a user through the touch sensor member 12, to indicate that the input operation has been reliably performed. The "vibration generating member" is not limited to the piezoelectric element 17 and can be, for example, a vibration motor or a voice coil motor.

As shown in FIG. 4, the piezoelectric element 17 is disposed at a lower end of the touch sensor member 12. The piezoelectric element 17 only needs to be capable of transmitting the vibration to the user through the touch sensor member 12 so as to allow the user to recognize that an input operation has been performed. Therefore, instead of at the lower end of the touch sensor member 12, the piezoelectric element 17 can be disposed, for example, at an inner surface of the touch sensor member 12 or between the touch sensor member 12 and the foundation 15b.

Alternatively, the piezoelectric element 17 (vibration generating member) can be disposed at the substrate to which is to be connected the tail portion 12e extending from the touch sensor member 12, and the substrate can be fixed to, for example, the lower end or the inner surface of the touch sensor member 12, to make it possible to transmit the vibration to the user.

Here, the gap 14 between the cover panel member 11 and the touch sensor member 12 extends in the Z direction (vertical direction) that is a direction perpendicular to the front-side surface of the touch sensor member 12. Therefore, when a displacement direction is the Z direction, the touch sensor member 12 can be most smoothly displaced without contacting the cover panel member 11. That is, the touch sensor member 12 is not in contact with the cover panel member 11. (The cover panel member 11 and the touch sensor member 12 are contactless.) Consequently, it is preferable that the piezoelectric element 17 vibrate the touch sensor member 12 in the Z direction. Thus, even if the gap 14 between the touch sensor member 12 and the cover panel member 11 is small, the touch sensor member 12 can be effectively vibrated.

As shown in FIG. 5, the touch sensor member 12 may be placed on the foundation 15b and the piezoelectric element 17 that are disposed below the cover panel member 11 and the touch sensor member 12. In this case, the foundation 15b becomes the fulcrum F that supports one part of the lower end surface of the touch sensor member 12. Therefore, a lever is formed at the touch-sensor integrated panel 10A, the lever being such that the other part of the lower end surface of the touch sensor member 12 that is pushed upward by the piezoelectric element 17 is an effort E, the foundation 15b is the fulcrum F, and the operation surface where the design film 13 pushes up the finger I of a user is the load L. In this way, in the touch-sensor integrated panel 10A where the foundation 15b is disposed, the principle of "leverage" makes it easier for vibration to be transmitted to the operation surface that is a surface of the design film 13 disposed on the touch sensor member 12.

The touch-sensor integrated panel 10A may have a plurality of piezoelectric elements 17 and a plurality of membrane switches 16. For example, as shown in FIG. 6, the touch-sensor integrated panel 10A has one membrane switch 16, two foundations 15b, and two piezoelectric elements 17. According to such a structure, as a result of combining the operations of the two piezoelectric elements 17 or using two different types of piezoelectric elements 17, it is possible to generate various vibration tactile sensations. For example, at the time of a contact input operation on the capacitive sensor resulting from movement of a finger along the operation surface and at the time of a push-in input operation on the membrane switch 16 resulting from a push-in input operation on the operation surface, two types (two stages) of operation sensations can be provided by generating different vibration tactile sensations.

Here, in order to increase the action of a force of the piezoelectric element 17, it is preferable to dispose the piezoelectric element 17, which is the effort E, as far as possible from the foundation 15b, which is the fulcrum F. Therefore, the foundation 15b and the piezoelectric element 17 are disposed at regions that are point-symmetrical with respect to the center of a circle of the touch sensor member 12 in plan view. When, for example, the shape of the touch sensor member 12 in plan view is rectangular, the foundation 15b and the piezoelectric element 17 only need to be disposed in regions on opposite sides or at opposite angles.

As described above, in the modification of the present embodiment, the touch-sensor integrated panel 10A further has a piezoelectric element 17 that vibrates the touch sensor member 12. Therefore, in the touch-sensor integrated panel 10A, for example, as a tactile (cutaneous sensation) feedback at the time of an operation, the touch sensor member 12 can be vibrated as required. Consequently, in the touch-sensor integrated panel 10A, it is possible to indicate to a user that an input operation has been reliably performed on the touch sensor member 12. Since the touch sensor member 12 here is separated from the cover panel member 11, the piezoelectric element 17 is capable of vibrating only the touch sensor member 12. Thus, in the touch-sensor integrated panel 10A, the touch sensor member 12 can be efficiently vibrated. Therefore, vibration can be reliably transmitted to the user even in a large electronic device that, unlike a small electronic device, is not portable.

Figure 7:
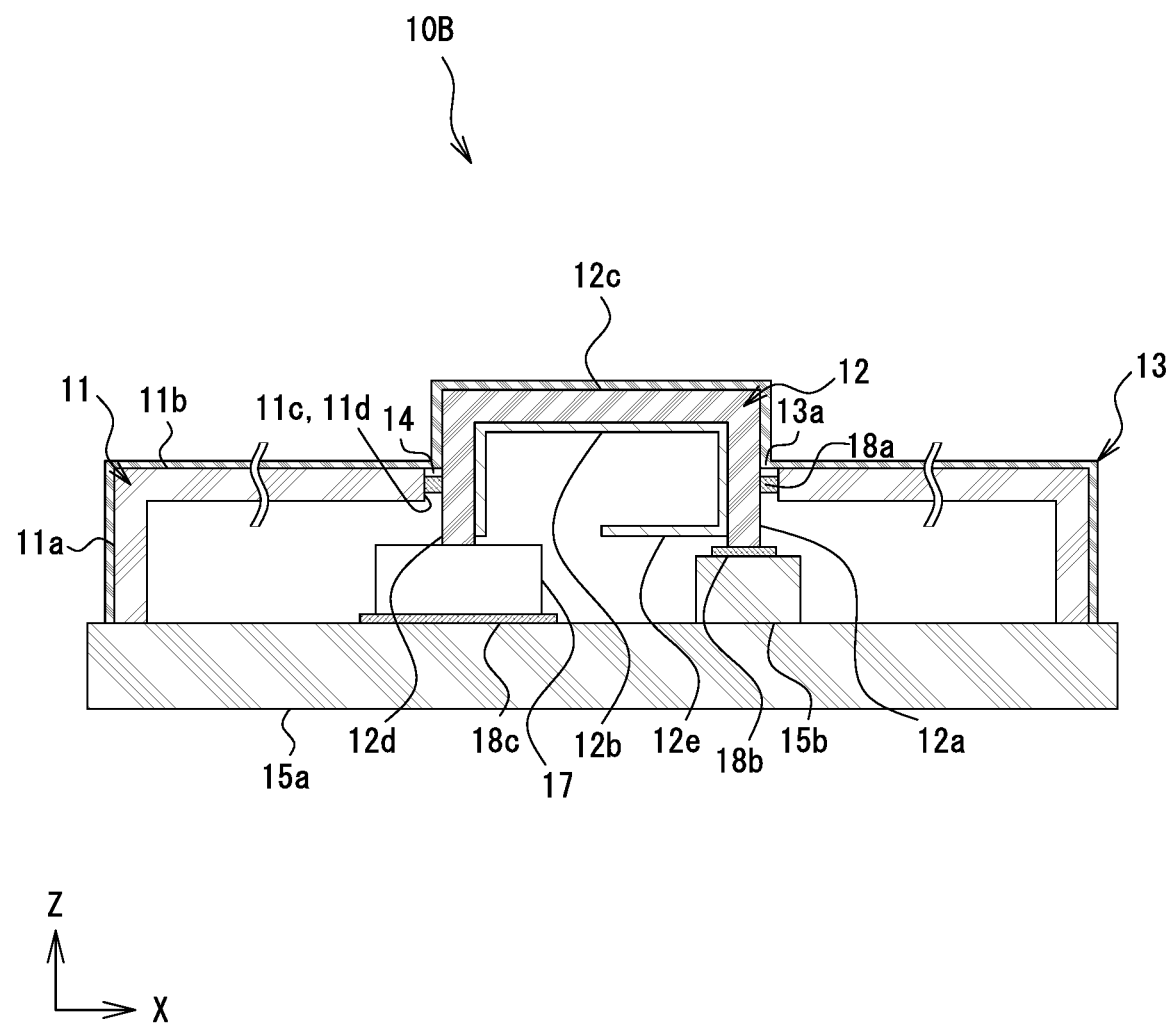
FIG. 7 is a sectional view, equivalent to FIG. 3, showing a touch-sensor integrated panel according to a different modification of the first embodiment.

Different Modification of First Embodiment (FIG. 7)

Since the touch-sensor integrated panel 10 of the present embodiment can be modified in a different way, an example thereof is described.

A touch-sensor integrated panel 10B of a different modification of the present embodiment may further have a shock-absorbing body 18 (a shock-absorbing body 18a, a shock-absorbing body 18b [[or]] and a shock-absorbing body 18c that) is disposed between each structural part thereof and that absorbs vibration generated at one of the structural part so as to prevent the vibration from being transmitted to another structural part. The shock-absorbing body 18a, shock-absorbing 18b, and shock-absorbing 18c have the function of, when vibration is transmitted from an adjacent structural part, absorbing the vibration by deforming themselves. For the shock-absorbing body 18a, shock-absorbing 18b, and shock-absorbing 18c, a foaming material, such as a urethane sponge, soft rubber, or soft gel can be used.

As shown in FIG. 7, in the touch-sensor integrated panel 10B, it is preferable that the shock-absorbing body 18a be provided at the inner edge 11d of the opening portion 11c of the cover panel member 11 and the standing wall portion 12d of the touch sensor member 12 opposing the inner edge 11d. In other words, it is preferable that the touch-sensor integrated panel 10B include the shock-absorbing body 18a in the gap 14 between the cover panel member 11 and the touch sensor member 12. The shock-absorbing body 18a may be provided at the cover panel member 11, or may be provided at the touch sensor member 12. The shock-absorbing body 18a may be provided with a ring shape or partly provided around an outer periphery of the touch sensor member 12.

In the touch-sensor integrated panel 10B, the shock-absorbing body 18a is capable of suppressing transmission of the vibration of the touch sensor member 12 and the piezoelectric element 17 to the cover panel member 11. Further, the touch-sensor integrated panel 10B is capable of reducing operation sound or collision sound with respect to the touch sensor member 12. Therefore, according to the different modification of the present embodiment, it is possible to end, in particular, the vibration that is generated at the touch sensor member 12 in the inside thereof and to suppress the vibration of the cover panel member 11.

As shown in FIG. 7, the touch-sensor integrated panel 10B can include a shock-absorbing body 18b that is disposed between the touch sensor member 12 and the foundation 15b, and a shock-absorbing body 18c that is disposed between the piezoelectric element 17 and the base material 15a. Therefore, it is possible to suppress the vibration of the touch sensor member 12 and the piezoelectric element 17 from being transmitted to the base material 15a. Further, when the design film 13 is also soft, vibration that is transmitted to the cover panel member 11 from the touch sensor member 12 through the design film 13 can be decreased.

Figure 8:
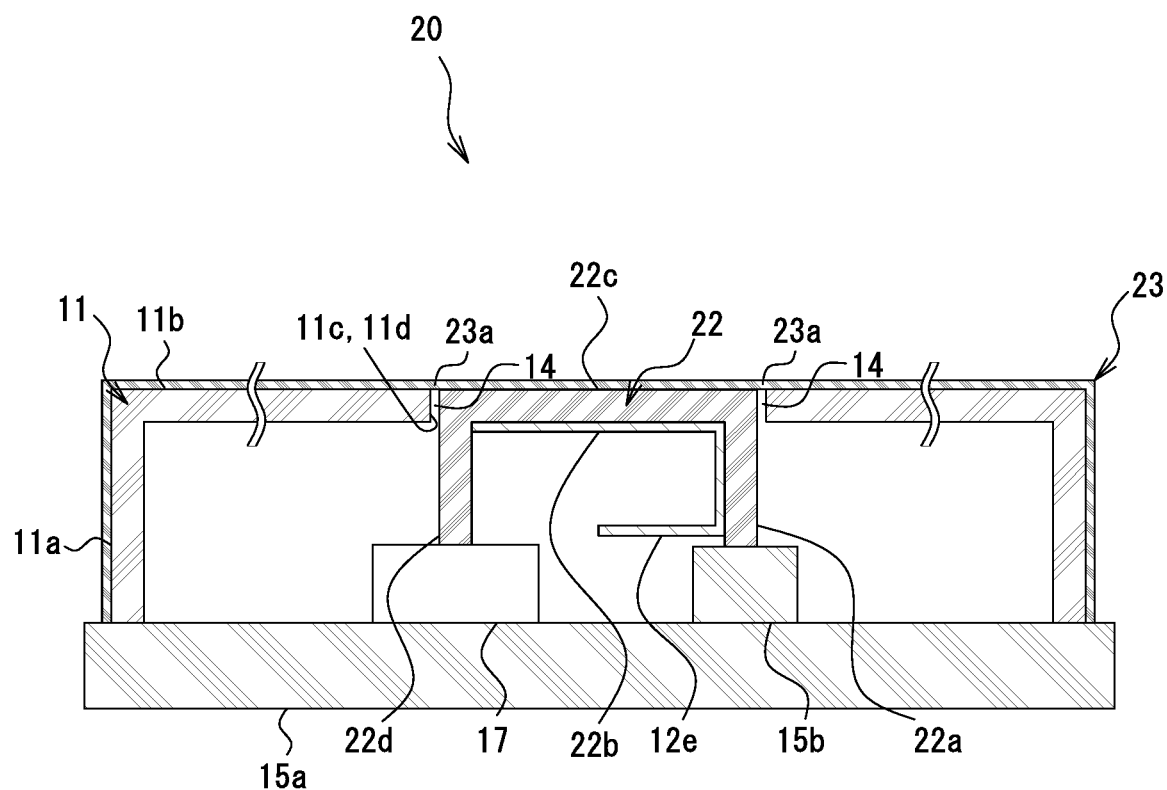
FIG. 8 is a sectional view, equivalent to FIG. 3, showing a touch-sensor integrated panel according to a second embodiment.
Figure 8:
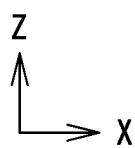
Figure 10:
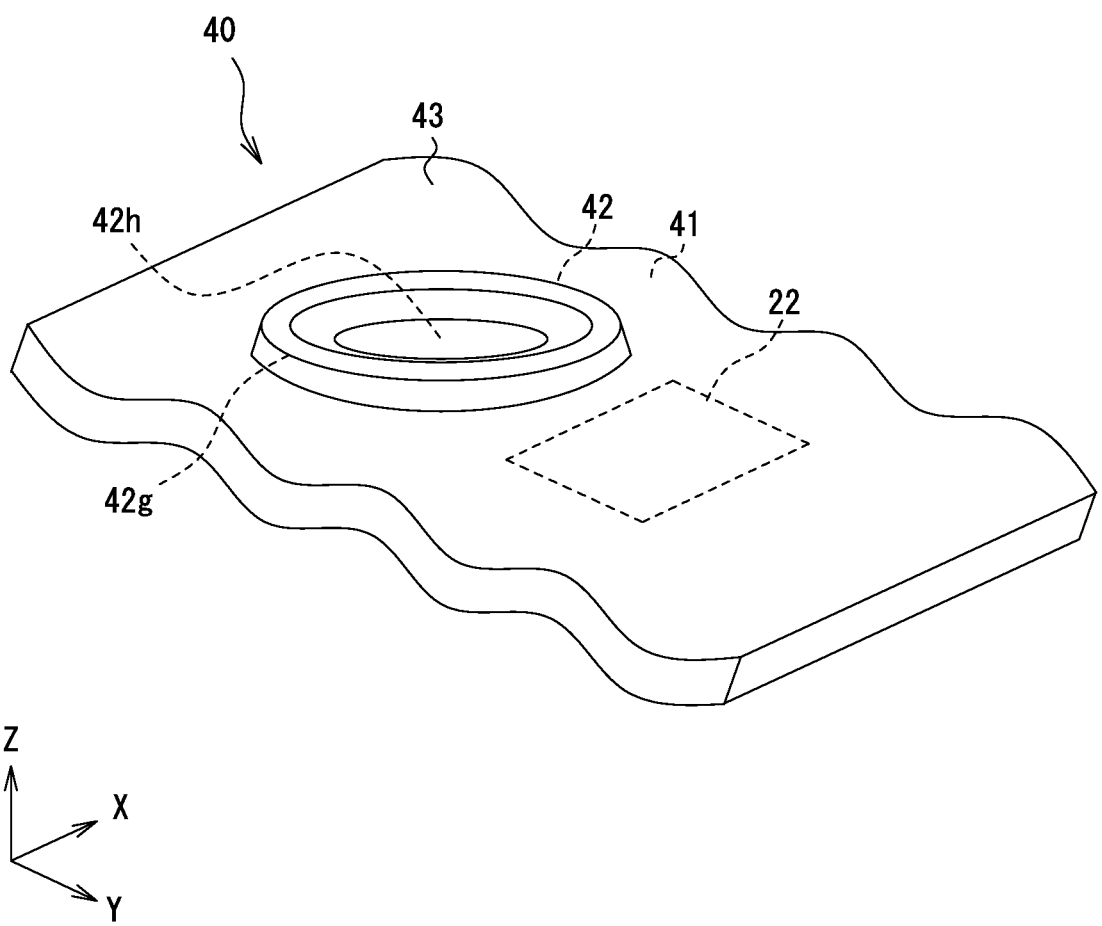
FIG. 10 is a perspective view of an external appearance of the touch-sensor integrated panel according to a fourth embodiment.

Second Embodiment (FIG. 2, FIG. 8, FIG. 10)

Portions having structures differing from those of the touch-sensor integrated panel 10A above are primarily described below with reference to the drawings of a touch-sensor integrated panel 20 of a second embodiment. Unless otherwise specified, the touch-sensor integrated panel 20 is capable of providing the same effects as those of the touch-sensor integrated panel 10A described above.

As shown in FIG. 8, the touch-sensor integrated panel 20 of the present embodiment has a cover panel member 11, serving as a "panel member", a touch sensor member 22, and a design film 23, serving as a "covering member". The cover panel member 11 is the same for the touch-sensor integrated panel 10A and the touch-sensor integrated panel 20.

The touch sensor member 22 has a resin molded body 22a and a film substrate 22b where an electrode part and a circuit of a capacitive sensor are mounted. The resin molded body 22a has a square tubular shape (box shape) that has, on an upper end of the resin molded body 22a, a surface extending along the XY plane, and that extends downward along the Z direction. The resin molded body 22a has an upper plate portion 22c and a standing wall portion 22d. The constitution of the touch sensor member 22 having the upper plate portion 22c and the standing wall portion 22d is the same as the constitution of the touch sensor member 12. However, the touch sensor member 22 is such that an upper end of the upper plate portion 22c is disposed at the same height as an upper end of a top plate 11b of the cover panel member 11, and does not have a "protruding portion". That is, in the touch-sensor integrated panel 20 of the present embodiment, an operation-surface-side surface of the touch sensor member 22 is a flat surface whose height is the same as the height of an outer surface of the cover panel member 11. An end of the film substrate 22b extending along the upper plate portion 22c is an edge, and does not extend along the standing wall portion 22d from the edge.

The cover panel member 11 and the resin molded body 22a of the touch sensor member 22 are disposed with a gap 14 therebetween, and are connected to and integrated with each other by the design film 23 that covers and connects to each other a surface of the cover panel member 11 and a surface of the resin molded body 22a. The gap 14 is covered by the design film 23, and the operation-surface-side surface of the touch sensor member 22 and the outer surface of the cover panel member 11 are flat surfaces at the same height, as a result of which the design film 13 that covers them has a flat surface without a step or the like.

The design film 23 has a movable portion 23a. Since the movable portion 23a is provided between the cover panel member 11 and the touch sensor member 22 that does not have a "protruding portion" as a result of having a flat surface at the same height as the cover panel member 11, as shown in FIG. 8, the movable portion 23a has a flat-plate shape in sectional view. The movable portion 23a is a portion of the design film 23 that is positioned at the gap 14 and is bendably formed as with the movable portion 13a. Therefore, even in the touch-sensor integrated panel 20, the touch sensor member 22 can be pushed in in a downward direction that is a vertical direction with respect to a front-side surface by pushing in the touch sensor member 22 with respect to the cover panel member 11.

In this way, the design film 23 is disposed via the gap 14, and integrally covers the operation-surface-side surface of the touch sensor member 22 and the outer surface of the cover panel member 11, which are flat surfaces at the same height. Therefore, according to the present embodiment, it is possible to realize an external appearance without a joint of the design film 23 while the gap 14 is formed between the touch sensor member 22 and the cover panel member 11. Consequently, according to the present embodiment, the graphic design function of the touch-sensor integrated panel 20 can be enhanced.

Figure 9:
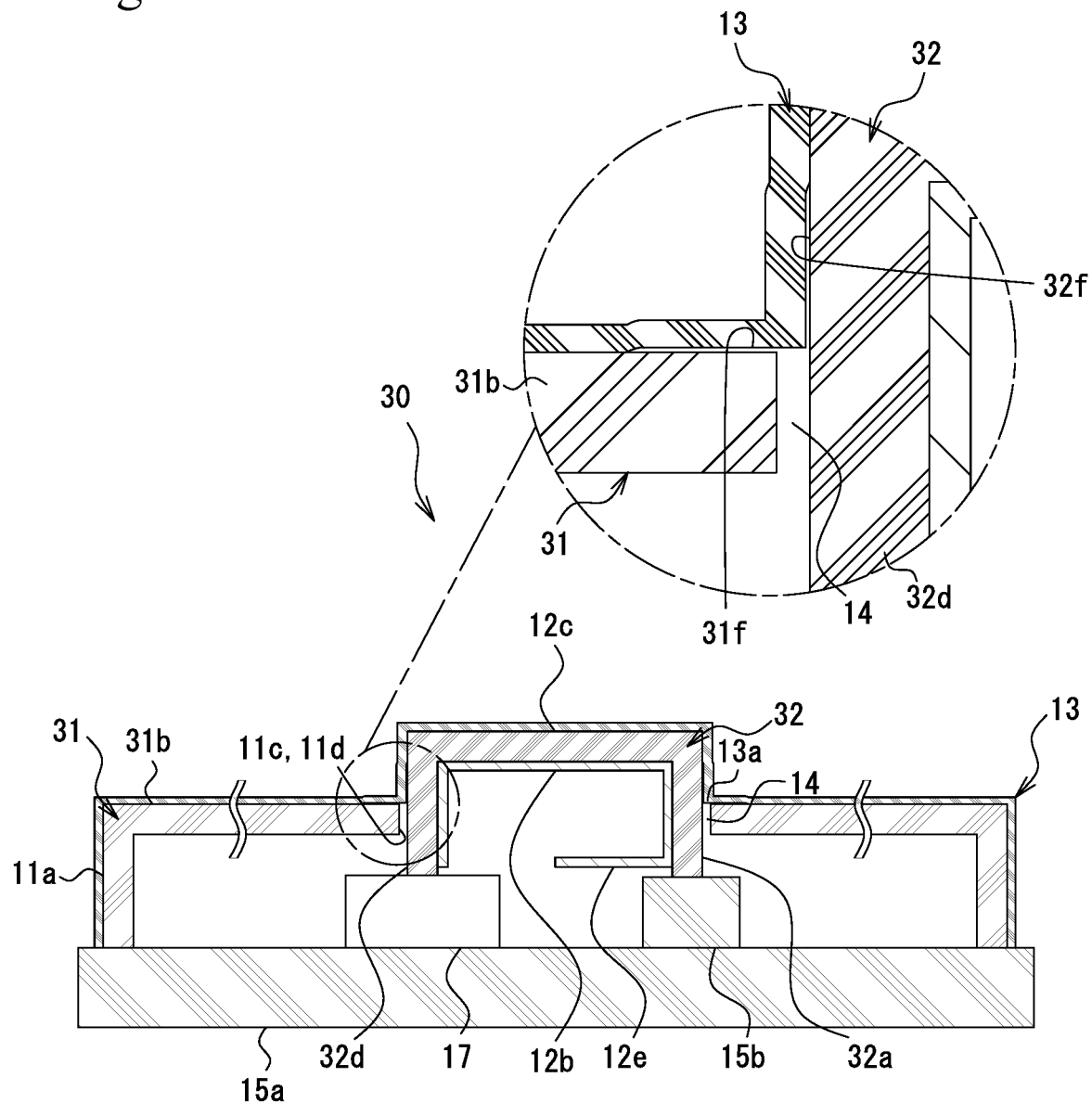
FIG. 9 is a sectional view, equivalent to FIG. 3, showing a touch-sensor integrated panel according to a third embodiment.

Third Embodiment (FIG. 9)

Portions having structures differing from those of the touch-sensor integrated panel 10A above are primarily described below with reference to the drawing of a touch-sensor integrated panel 30 of a third embodiment. Unless otherwise specified, the touch-sensor integrated panel 30 is capable of providing the same effects as those of the touch-sensor integrated panel 10A described above.

As shown in FIG. 9, the touch-sensor integrated panel 30 of the present embodiment has a cover panel member 31, a touch sensor member 32, and a design film 13, serving as a "covering member". The design film 13 is the same for the touch-sensor integrated panel 10A and the touch-sensor integrated panel 30.

At an inner edge 11d that forms an opening portion 11c, the cover panel member 31 has a panel-side non-fixed film 31f serving as a "first non-fixed region" that is not fixed to the design film 13. Similarly, the touch sensor member 32 has a sensor-side non-fixed film 32f serving as a "second non-fixed region" that is not fixed to a movable portion 13a of the design film 13 that is positioned at the opening portion 11c. More specifically, both an outer surface (top surface) of a top plate 31b of the cover panel member 31 adjacent to a gap 14 and an outer peripheral surface of a standing wall portion 32d of a resin molded body 32a of the touch sensor member 32 are formed so as to be movable away from the design film 13 without being fixed to the design film 13.

Therefore, when the touch sensor member 32 is pushed downward with respect to the cover panel member 31, a region that bends and deforms (flexes) is widened instead of the design film 13 being deformed by being extended and contracted. That is, the panel-side non-fixed film 31f and the sensor-side non-fixed film 32f have the function of widening a region where the design film 13 functions as the movable portion 13a. Further, when the touch sensor member 32 is pushed downward with respect to the cover panel member 31, the movable portion 13a of the design film 13 is suppressed from being caught in the gap 14. Therefore, in the touch-sensor integrated panel 30, the touch sensor member 32 can be easily displaced in an up-down direction with respect to the cover panel member 31.

The panel-side non-fixed film 31f and the sensor-side non-fixed film 32f are formed by applying, for example, non-fixed materials to regions concerned of the cover panel member 31 and the touch sensor member 32. However, the "non-fixed regions" only need to be capable of reducing the attachability (sticking tendency, shear adhesion) of the regions concerned, and thus may be fine uneven portions provided at surfaces of the regions concerned. Further, the "non-fixed regions" may be those in which release treatment (surface treatment) is performed on regions concerned of the design film 13.

As described above, in the touch-sensor integrated panel 30 of the present embodiment, at least one of the cover panel member 31 and the touch sensor member 32 has, at a region near the gap 14, a "non-fixed region" that is not fixed to the design film 13. Therefore, when the touch sensor member 32 is displaced with respect to the cover panel member 31, the design film 13 can separate at the "non-fixed region" instead of being deformed by being extended and contracted in response to a relative displacement between the cover panel member 31 and the touch sensor member 32. Consequently, according to the present embodiment, the design film 13 does not act to resist the displacement of the touch sensor member 32 with respect to the cover panel member 31 caused by a push-in input operation, and thus the touch sensor member 32 can be easily pushed.

In the present embodiment, as shown in FIG. 9, the cover panel member 31 has a panel-side non-fixed film 31f and the touch sensor member 32 has a sensor-side non-fixed film 32f. However, the touch-sensor integrated panel 30 only needs to be one in which at least one of the cover panel member 31 and the touch sensor member 32 has, at a region near the gap 14, a "non-fixed region" that is partly not fixed to the design film 13.

Figure 11:
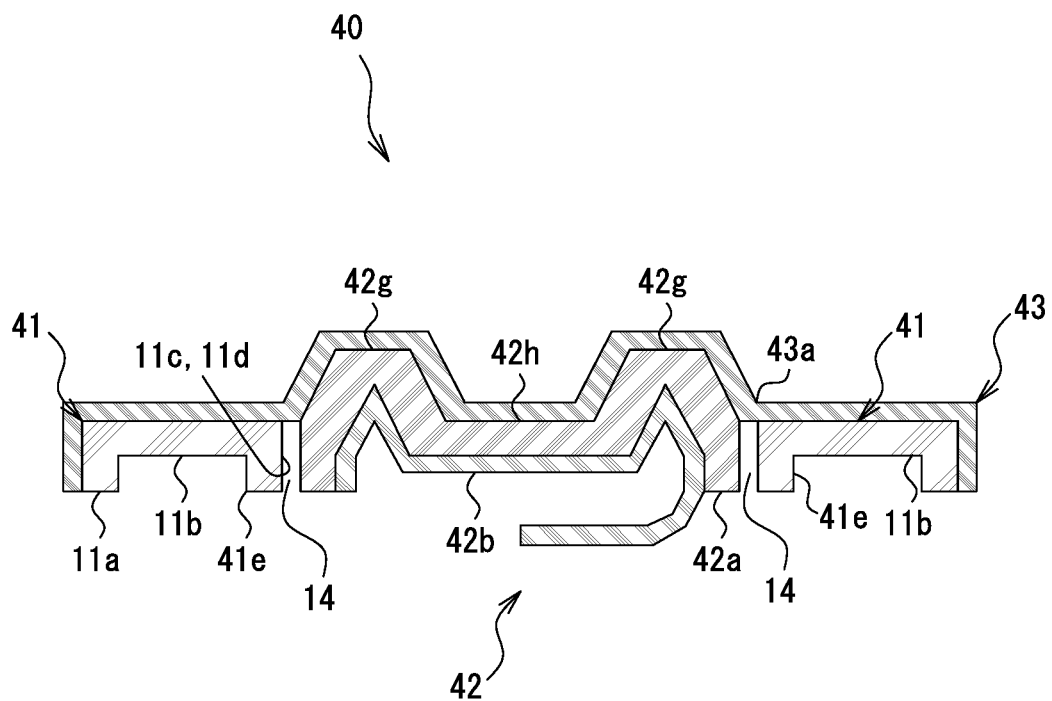
FIG. 11 is a sectional view, equivalent to FIG. 3, showing the touch-sensor integrated panel according to the fourth embodiment.
Figure 11:
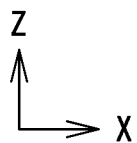

Fourth Embodiment (FIG. 10 to FIG. 11)

Portions having structures differing from those of the touch-sensor integrated panel 10 above are primarily described below with reference to the drawings of a touch-sensor integrated panel 40 of a fourth embodiment. Unless otherwise specified, the touch-sensor integrated panel 40 is capable of providing the same effects as those of the touch-sensor integrated panel 10 described above.

As shown in FIG. 10 and FIG. 11, the touch-sensor integrated panel 40 of the present embodiment has a cover panel member 41, serving as a "panel member", a touch sensor member 42, and a design film 43, serving as a "covering member".

The cover panel member 41 has a plate-shaped inner frame body 41e extending downward in the Z direction from an inner edge 11d (opening portion 11c) of a top plate 11b. The touch sensor member 42 has a resin molded body 42a and a film substrate 42b. The resin molded body 42a has a protruding portion 42g that has a ring shape and that protrudes upward in the Z direction on an outer peripheral side in plan view, and a recessed portion 42h that has a circular shape and that is recessed downward in the Z direction from the protruding portion 42g on an inner peripheral side of the protruding portion 42g. That is, in the touch-sensor integrated panel 40, the touch sensor member 42 has a three-dimensional shape protruding upward in the form of a ring. The protruding portion 42g, instead of protruding vertically upward in the Z direction, protrudes with an inclined surface being provided so as to have a tapering shape in sectional view.

The design film 43 is disposed so as to be bent along an upper-side front surface (front-side surface) of the resin molded body 42a that has an uneven surface. The design film 43 has a movable portion 43a. On a side of the cover panel member 41, the movable portion 43a is disposed on the top plate 11b having a surface along the XY plane, and, on a side of the touch sensor member 42, the movable portion 43a is disposed on the tapering inclined surface. Therefore, as shown in FIG. 11, the movable portion 13a has a shape having an obtuse angle that is larger than the angle of an L shape in sectional view.

The film substrate 42b is disposed so as to be bent along a lower surface (back-side surface) of the resin molded body 42a that has an uneven surface. In this way, an "input operation unit" (electrode part of capacitive touch sensor) may be provided at a "standing wall surface" that is an outer peripheral surface and an inner peripheral surface of the ring shape of the touch sensor member 42, may be provided at a protruding apex portion of the ring shape, or may be provided at a surface whose center is recessed.

In this way, when the resin molded body 42a has a three-dimensional shape, the "input operation unit" can be provided at the "standing wall surface" of the resin molded body 42a, and the electrode part of the capacitive sensor is also disposed toward the "input operation unit" at the standing wall surface". This is applicable not only to the present embodiment, but also to all the other embodiments excluding the second embodiment not having a "protruding portion".

As described above, in the touch-sensor integrated panel 40, the surface of the touch sensor member 42 has an uneven shape including the protruding portion 42g, and the electrode part is disposed along the "standing wall surface" that is formed at a side portion of the protruding portion 42g. Therefore, in the touch-sensor integrated panel 40, the touch sensor member 42 is capable of guiding a movement operation by a user along the protruding portion 42g and detecting a change in the capacitance of the electrode part disposed along the protruding portion 42g. Consequently, according to the present embodiment, it is possible to allow an input operation of choosing one from among a plurality of choices or adjusting the quantity.

Figure 12:
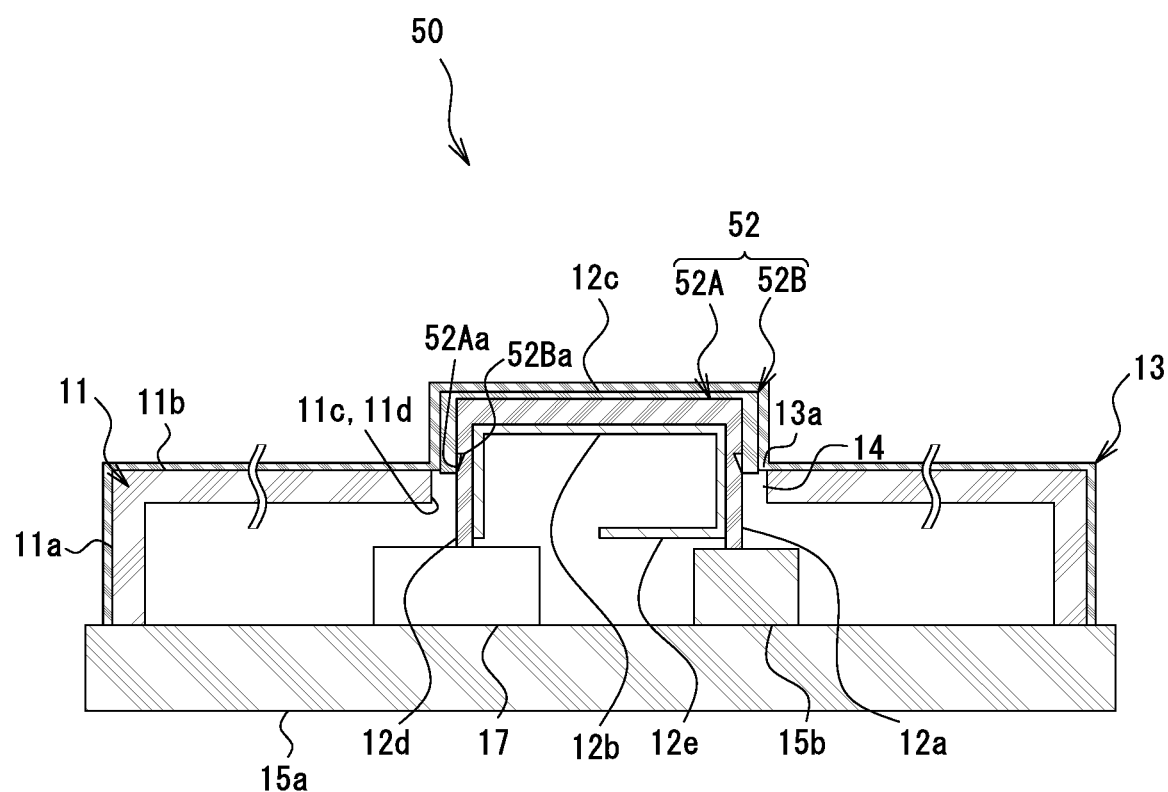
FIG. 12 is a sectional view, equivalent to FIG. 3, showing a touch-sensor integrated panel according to a fifth embodiment.

Fifth Embodiment (FIG. 12)

Portions having structures differing from those of the touch-sensor integrated panel 10A above are primarily described below with reference to the drawing of a touch-sensor integrated panel 50 of a fifth embodiment. Unless otherwise specified, the touch-sensor integrated panel 50 is capable of providing the same effects as those of the touch-sensor integrated panel 10A described above.

As shown in FIG. 12, the touch-sensor integrated panel 50 of the present embodiment has a cover panel member 11, serving as a "panel member", a touch sensor member 52, and a design film 13, serving as a "covering member". The cover panel member 11 and the design film 13 are the same as those of the touch-sensor integrated panel 10A and the touch-sensor integrated panel 50.

The touch sensor member 52 includes a body portion 52A having a structure that is substantially the same as that of the touch sensor member 12, and a receiving portion 52B. In the touch-sensor integrated panel 50, the touch sensor member 52 has a split structure due to the body portion 52A and the receiving portion 52B, and the body portion 52A is configured to be partly attachable to and detachable from the receiving portion 52B. The receiving portion 52B is positioned on an upper side and an outer peripheral side of the touch-sensor integrated panel 50, and the body portion 52A is positioned so as to overlap a lower side and an inner peripheral side of the receiving portion 52B.

The receiving portion 52B has a cylindrical shape with a top. The receiving portion 52B has a pair of hook-shaped portions 52Ba at a lower end portion on an inner peripheral side of its cylindrical shape. A front-side surface on an upper side and an outer peripheral side of the receiving portion 52B serving as a "protruding portion" protruding above the cover panel member 11 is integrally covered by the design film 13. The body portion 52A has hook receiving recessed portions 52Aa on an outer peripheral side of the body portion 52A at a standing wall portion 12d in correspondence with the hook-shaped portions 52Ba. By positioning and engaging the hook-shaped portions 52Ba and the hook receiving recessed portions 52Aa at the positions of the recessed portions and the protruding portions, the receiving portion 52B and the body portion 52A are integrated with each other to form the touch sensor member 52.

If it becomes necessary to replace a touch sensor member 12 that is not attachable to or detachable from the touch-sensor integrated panel 10A, either the entire touch-sensor integrated panel 10A is replaced or the touch sensor member 12 is separated from the design film 13. However, replacing the entire touch-sensor integrated panel 10A for replacing the touch sensor member 12 is uneconomical. On the other hand, if the touch sensor member 12 is to be separated from the design film 13, it is desirable that there be excellent re-separability (re-workability) between the touch sensor member 12 and the design film 13, whereas, in general, the reliability of adhesion contrary to this tends to be reduced. Further, after the touch sensor member 12 has been separated from the design film 13, it is not easy to attach a different touch sensor member 12 so as to prevent entry of a foreign substance such as air.

In contrast, in the touch-sensor integrated panel 50, the body portion 52A of the touch sensor member 52 is configured to be attachable to and detachable from the receiving portion 52B. Therefore, in the touch-sensor integrated panel 50, if it becomes necessary to replace the touch sensor member 52, the body portion 52A of the touch sensor member 52 can be replaced with the touch-sensor integrated panel 50 remaining as it is. That is, it is possible to continue using the touch-sensor integrated panel 50 without replacing the entire touch-sensor integrated panel 50, and to reduce to a minimum the components that need to be replaced. Consequently, in the present embodiment, the reliability of the touch sensor member 52 can be ensured while reducing ineffectiveness in replacing the touch sensor member 52.

When the body portion 52A and the receiving portion 52B are too thick, the distance from a finger I that performs an input operation to the capacitive sensor becomes too large, and thus detection can become difficult, as a result of which it is preferable that the body portion 52A and the receiving portion 52B be made as thin as possible. Further, when an air layer is partly interposed at an interface between the body portion 52A and the receiving portion 52B, detection of the capacitive sensor differs depending upon the thickness of the air layer and false detection can occur, as a result of which it is preferable that an air layer not exist to the extent possible.

For the method of connecting the body portion 52A and the receiving portion 52B, various methods can be used as long as they allow the body portion 52A and the receiving portion 52B to be attached to and to be detached from each other. For example, the body portion 52A and the receiving portion 52B may be press-fitted to each other, brought into close contact with each other, and superimposed upon each other without a gap therebetween; the body portion 52A and the receiving portion 52B may be screwed to each other with a threaded groove being provided in a side surface of a ring shape; or the body portion 52A and the receiving portion 52B may be held so as not to fall off with, for example, a hook-shaped member or a clip member being provided.

In the "decorative panel" that is disclosed in the present application, the structures described in the embodiments and the modifications can be freely combined within a scope that does not give rise to inconsistency. For example, the "decorative panel" may or may not have a structure corresponding to the membrane switch 16, the piezoelectric element 17, the shock-absorbing body 18, the panel-side non-fixed film 31f, or the sensor-side non-fixed film 32f. The structure of the second embodiment in which the cover panel member 11 and the touch sensor member 12 are provided at same height may be combined with the structures of the other embodiments and modifications. Further, the structure of the fourth embodiment in which the touch sensor member 42 has a three-dimensional shape protruding upward in the form of a ring may be combined with the structures of the other embodiments and modifications. The structure of the fifth embodiment in which the touch sensor member 52 is configured to be attachable and detachable may be combined with the structures of the other embodiments and modifications.

REFERENCE SIGNS LIST 10 touch-sensor integrated panel (first embodiment) (decorative panel)
20 touch-sensor integrated panel (second embodiment) (decorative panel)
30 touch-sensor integrated panel (third embodiment) (decorative panel)
40 touch-sensor integrated panel (fourth embodiment) (decorative panel)
50 touch-sensor integrated panel (fifth embodiment) (decorative panel)

The invention claimed is:

1. A decorative panel comprising:
a panel member that has a frame body, a top plate, and an opening portion formed in the top plate, the frame body extending downwardly from a part of the top plate and supporting the top plate;
a touch sensor member that is disposed at the opening portion; and
a covering member that covers the frame body and the top plate of the panel member and the touch sensor member integrally, and that has a movable portion that supports the touch sensor member so that the touch sensor member is displaceable with respect to the panel member,
wherein the touch sensor member has a film substrate where an electrode part and a circuit of a capacitive sensor are mounted, and
a tail portion that is extended from the film substrate, and located in a space formed by the top plate and the frame body.

2. The decorative panel according to claim 1,
wherein the touch sensor member has
a resin molded body, and
a film substrate where an electrode part and a circuit of a capacitive sensor are mounted, and
wherein the touch sensor member has the film substrate at at least one of a front surface and a back surface of the resin molded body.

3. The decorative panel according to claim 2,
wherein the touch sensor member has, at the front surface, an uneven shape including a protruding portion, and
wherein the electrode part is disposed along a standing wall surface that is formed at a side portion of the protruding portion.

4. The decorative panel according to claim 1,
wherein the panel member has, at a peripheral edge that forms the opening portion, a first non-fixed region that is not fixed to the covering member.

5. The decorative panel according to claim 1,
wherein the touch sensor member has a second non-fixed region that is not fixed to the movable portion that is positioned at the opening portion.

6. The decorative panel according to claim 1, further comprising:
a shock-absorbing body,
wherein the shock-absorbing body is disposed at a peripheral edge of the opening portion.

7. The decorative panel according to claim 1, further comprising:
a shock-absorbing body,
wherein the shock-absorbing body is disposed at the touch sensor member so as to oppose a peripheral edge of the opening portion.

8. The decorative panel according to claim 1, further comprising:
a vibration generating member that vibrates the touch sensor member.

9. The decorative panel according to claim 1, further comprising:
a receiving portion that receives the touch sensor member, wherein the touch sensor member is configured to be attachable to and detachable from the receiving portion.

10. The decorative panel according to claim 1, wherein the covering member integrally covers an outer surface of the panel member and an operation-surface-side surface of the touch sensor member that is disposed at the opening portion.

11. The decorative panel according to claim 1, wherein the panel member and the touch sensor member are arranged on a film surface of the covering member and form an integrated structural body in which the panel member and the touch sensor member are connected by the covering member.

12. The decorative panel according to claim 1, wherein the panel member has a peripheral edge that forms the opening portion,
wherein the touch sensor member has, at a front surface of a resin molded body of the touch sensor member, an uneven shape including a protruding portion, and has a standing wall surface that is formed at a side portion of the protruding portion, and
wherein the touch sensor member is such that the standing wall surface is disposed so as to oppose the peripheral edge.

13. The decorative panel according to claim 1, wherein the touch sensor member has a protruding portion that protrudes toward a front side with respect to an outer surface of the panel member.

14. The decorative panel according to claim 1, wherein an operation-surface-side surface of the touch sensor member is a flat surface whose height is equal to a height of an outer surface of the panel member.

15. The decorative panel according to claim 1, wherein the touch sensor member has a standing wall portion that extends in a direction in which the opening portion extends through the panel member, and
wherein the standing wall portion is placed on a vibration generating member that is provided at a base material and that vibrates the touch sensor member.

16. The decorative panel according to claim 1, wherein the touch sensor member has a body portion and a receiving portion which is configured to be detachable from the body portion.

17. A decorative panel comprising:
a panel member that has a frame body, a top plate, and an opening portion formed in the top plate, the frame body extending downwardly from a part of the top plate and supporting the top plate;
a touch sensor member that is disposed at the opening portion; and
a covering member that covers the frame body and the top plate of the panel member and the touch sensor member integrally, and that has a movable portion that supports the touch sensor member so that the touch sensor member is displaceable with respect to the panel member,
wherein the touch sensor member has a standing wall portion extends downwardly, and a first lower end surface of the touch sensor member is placed on a foundation and a second lower end surface of the touch sensor member is placed on a membrane switch.

18. A decorative panel comprising:

a panel member that has a frame body, a top plate, and an opening portion formed in the top plate, the frame body extending downwardly from a part of the top plate and supporting the top plate;

a touch sensor member that is disposed at the opening portion; and a covering member that covers the frame body and the top plate of the panel member and the touch sensor member integrally, and that has a movable portion that supports the touch sensor member so that the touch sensor member is displaceable with respect to the panel member, wherein the touch sensor member has a standing wall portion extends downwardly, and a first lower end surface of the touch sensor member is placed on a base material, and a second lower end surface of the touch sensor member is placed on a membrane switch.

\* \* \* \* \*